UNITED STATES PATENT OFFICE.

ADOLPHE M. MILLOCHAU, OF NEW YORK, N. Y., ASSIGNOR TO HENRY LEVRAT.

IMPROVEMENT IN METHODS OF EXTRACTING OIL FROM FISH.

Specification forming part of Letters Patent No. 31,765, dated March 19, 1861.

*To all whom it may concern:*

Be it known that I, ADOLPHE M. MILLOCHAU, of the city, county, and State of New York, have invented a new and Improved Process of Extracting Oil from Fishes; and I do hereby declare that the following is a full, clear, and exact description of the same.

The usual method of extracting the oil from fishes is to cut up the fishes into small pieces and to boil them in water for a period of several days. A small portion of the oil accumulates on the surface of the water, and it is scooped off and filled in suitable casks. The largest portion of the oil remains in the bodies or in the flesh of the fishes, and has to be obtained by pressing. The whole of this operation is very tedious, it takes much time, and it requires a large quantity of fuel and of machinery, and, after all, the oil obtained in this manner is mixed with a great many impurities, which fact is plainly shown by its appearance. The fish-oil extracted in this manner has a dark (nearly black) color, whereas the pure fish-oil is of a light color, and, if properly refined, it is almost colorless, like water.

My said invention consists in a process whereby I obtain oil directly from fish without the necessity of waiting for the fish to disintegrate in the natural way, by rotting, and without the use of presses or forcible means of separation.

I place the fish in a bath of dilute sulphuric acid, in volume about double that of the mass of fish to be operated upon, or sufficient in quantity to permit the oil to separate readily from the remains of the fish by difference in specific gravity, so that it can be drawn off into a separate vessel when the operation is concluded, and more fish introduced into the bath. The dilute sulphuric acid should be sufficiently strong to disintegrate the fish by the aid of a gentle application of heat at a temperature, say, about 130° to 200° Fahrenheit, a much higher temperature injuring the character of the oil. About thirty-three per cent. of sulphuric acid, 66° Baumé, will generally answer the purpose, although the precise proportion that will suffice will vary with the character of the fish, soft fish requiring less than hard fish. I continue the fish in the bath until it is completely disintegrated. The oil rising to the surface is drawn off into another vessel and filtered by pouring through a cloth. The remains of the fish sink to the bottom of the bath, forming, with a portion of the acid, well-known useful fertilizing compounds. Care must be taken to add to the bath sufficient acid at each successive operation to make up for the diminution thus occasioned. The use of sulphuric acid in a process of breaking up rough fats and expressing tallow therefrom is well known, as is also its use in a concentrated form for the purpose of arresting rot in fish, so that they may be transported to a distance from the place where they are caught and used as a manure without accompanying intolerable fetid odors. Dilute sulphuric acid has also been used with salt for the same purpose, and some oil incidentally obtained from the mass when in process of being compacted by pressure for the purpose of convenient transportation; but in such cases the object was to convert all the fish, or as much as possible, into manure, and no attempt that I know of has been made by others to manufacture fish-oil by extracting the oil directly from the fish by a bath of dilute sulphuric acid and without mechanical pressure.

What I claim as my invention and improvement in the manufacture of oil from fish is—

The above-described process, substantially, of obtaining oil directly from fish by means of a bath of dilute sulphuric acid and without forcible separation by pressing.

ADOLPHE M. MILLOCHAU.

Witnesses:
M. M. LIVINGSTON,
B. GIROUXE.